US011548402B2

(12) United States Patent
Cesiel et al.

(10) Patent No.: US 11,548,402 B2
(45) Date of Patent: Jan. 10, 2023

(54) HOST SYSTEM WITH AC CHARGING INLET AND METHOD FOR IDENTIFYING AN ELECTRICAL DEVICE CONNECTED THERETO

(71) Applicant: GM GLOBAL TECHNOLOGY OPERATIONS LLC, Detroit, MI (US)

(72) Inventors: Douglas S. Cesiel, Farmington, MI (US); Jacob A. St George, Royal Oak, MI (US); Brandon R. Jones, White Lake, MI (US); Aniket P. Kothari, Rochester Hills, MI (US); Patricia M. Laskowsky, Ann Arbor, MI (US); Bryan M. Ludwig, West Bloomfield, MI (US); Bryan T. Sauter, New Hudson, MI (US); Giovanni Spoleti, Turin (IT); Jack M. Williams, Canton, MI (US); Bo Xie, Novi, MI (US); Matthew A. Thomas, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 259 days.

(21) Appl. No.: 17/122,568

(22) Filed: Dec. 15, 2020

(65) Prior Publication Data

US 2022/0185137 A1  Jun. 16, 2022

(51) Int. Cl.
*B60L 53/62* (2019.01)
*B60L 53/16* (2019.01)

(52) U.S. Cl.
CPC .............. *B60L 53/62* (2019.02); *B60L 53/16* (2019.02); *B60L 2250/24* (2013.01)

(58) Field of Classification Search
CPC ....... B60L 53/62; B60L 53/16; B60L 2250/24
USPC ........................................................ 320/109
See application file for complete search history.

(56) References Cited

U.S. PATENT DOCUMENTS

| 11,427,100 | B2* | 8/2022 | Ando | B60L 53/11 |
| 2009/0001927 | A1* | 1/2009 | Stamos | H02J 7/005 |
| | | | | 340/636.2 |
| 2011/0022256 | A1* | 1/2011 | Asada | G07C 9/00309 |
| | | | | 701/22 |
| 2013/0342163 | A1* | 12/2013 | Naruse | H02J 7/0036 |
| | | | | 320/109 |

(Continued)

FOREIGN PATENT DOCUMENTS

| CN | 104553845 A | * | 4/2015 | .............. B60L 1/003 |
| DE | 102019214494 A1 | * | 3/2021 | .............. B60L 53/14 |

*Primary Examiner* — Suresh Memula
(74) *Attorney, Agent, or Firm* — Quinn IP Law

(57) ABSTRACT

A controller of a host system executes a method for detecting an external AC electrical device. While an AC charging inlet of the host system is electrically connected to the device via different vehicle-to-live (V2L) and jump-charge connections, the controller detects a control pilot voltage and a proximity voltage. When the control pilot voltage is 0V, the controller determines whether entry conditions are satisfied indicative of a desire to offload power from the host system to the device. When the entry conditions are satisfied, the proximity or control pilot voltage are modulated to generate a modulated voltage signal, which the controller compares to an expected voltage indicative of the device. Power is offloaded to the device when the modulated voltage signal matches the expected voltage.

20 Claims, 6 Drawing Sheets

(56) References Cited

U.S. PATENT DOCUMENTS

| | | | |
|---|---|---|---|
| 2014/0197843 A1* | 7/2014 | Schurman | B60L 53/14 |
| | | | 324/509 |
| 2014/0203777 A1* | 7/2014 | Flack | B60L 53/66 |
| | | | 320/109 |
| 2015/0212135 A1* | 7/2015 | Jin | G01R 31/006 |
| | | | 324/538 |
| 2015/0375621 A1* | 12/2015 | Ono | B60L 55/00 |
| | | | 307/10.1 |
| 2016/0368391 A1* | 12/2016 | Kojima | B60L 53/65 |
| 2018/0208066 A1* | 7/2018 | Rao | H02J 7/0048 |
| 2019/0241073 A1* | 8/2019 | Homedes Pedret | B60L 53/305 |
| 2020/0298722 A1* | 9/2020 | Smolenaers | B60L 53/53 |
| 2021/0245610 A1* | 8/2021 | Ando | B60L 53/66 |
| 2021/0376524 A1* | 12/2021 | Ueki | H01R 13/6278 |
| 2022/0089052 A1* | 3/2022 | Margosian | B60L 53/66 |
| 2022/0214408 A1* | 7/2022 | Zhou | B60L 53/16 |
| 2022/0332201 A1* | 10/2022 | Khamashta | B60L 53/305 |

\* cited by examiner

HOST SYSTEM WITH AC CHARGING INLET AND METHOD FOR IDENTIFYING AN ELECTRICAL DEVICE CONNECTED THERETO

INTRODUCTION

The present disclosure relates to a host system having an alternating current (AC) charging inlet, and in particular to associated methods for automatically detecting and identifying an AC electrical device connected to the charging inlet. Automatic detection and identification of the connected electrical device, which could be of several different constructions and voltage requirements as set forth herein, takes place prior to offloading power from a rechargeable energy storage system (RESS) of the host system to the connected electrical device. In the various exemplary embodiments described in detail herein, the host system is a motor vehicle or other mobile platform having an electrified powertrain drawing power from the RESS. For simplicity, the host system is thus referred to interchangeably herein as a host vehicle without limiting the present disclosure to mobile systems in general or motor vehicles in particular.

As appreciated in the art, the automatic charging of electrochemical battery cells of a propulsion battery pack, the latter being a core part of the above-noted RESS, may be accomplished using an offboard electric vehicle supply equipment (EVSE) charging station. To that end, the host vehicle is ordinarily equipped with the above-noted AC charging inlet, which in turn is arranged at an accessible location on a body of the host vehicle. Charging terminals of the charging inlet are configured to receive and engage with mating charging pins of an EVSE charging plug, with the plug connected via an electrical cable to the above-noted charging station. In North America, such a plug is typically embodied as a five-pin SAE J1772 charge connector in which the five pins correspond to a Line 1 (L1) terminal, a Line 2/neutral (L2/N) voltage terminal, a ground (G) terminal, a 0-12V control pilot (CP) voltage terminal, and a 0-5V proximity (PRX) voltage terminal. However, different pin arrangements may be used in other geographical regions according to relevant charging standards.

During routine battery charging operations in which the propulsion battery pack of the host vehicle is being actively charged, the host vehicle remains securely connected to the offboard EVSE charging station via latching engagement of the EVSE charging plug and mating structure of the AC charging inlet. However, when active charging has ceased, or when the battery pack is likewise is not discharging to power an onboard electrical load, electrical energy stored in the constituent battery cells of the battery pack/RESS remains available as a potential energy source. When connecting an external AC electrical device to the charging inlet, however, the host vehicle is not aware of the connected device's identity, which in turn complicates subsequent power offloading control decisions.

SUMMARY

Hardware and software solutions provided herein enable automatic onboard controller-based detection and identification of an externally-connected alternating current (AC) electrical device of one of two types: (1) a vehicle-to-live (V2L) load connection box with an accompanying V2L cord set and end connectors, collectively forming a V2L connection, or (2) a jump-charge cord set connected at one end to a EVSE charging cord set, with the two cord sets and their end plugs collectively forming a jump-charge connection. Resident/onboard control logic for performing the present method resides on an electrified host system, which itself may be a battery electric vehicle (BEV) or a hybrid electric vehicle (HEV) in the non-limiting embodiments described below, or another mobile or stationary system having its own resident rechargeable energy storage system (RESS). The RESS of the host system is embodied herein as a multi-cell high-voltage propulsion battery pack having a lithium-ion, nickel metal hydride, or another application-suitable electrochemical battery chemistry.

AC discharge accessories that may be plugged into the V2L load connection box in various contemplated embodiments may be nominal 120V polyphase devices, while the EVSE charging cord set and its end connectors used in an exemplary "jump-charge" scenario is typically configured as a higher-voltage device, e.g., a nominal 240V AC device. In the jump-charge use scenario, the jump-charge cord set and the EVSE charging cord set are ultimately used to conduct offloaded power from the RESS of the host vehicle to a depleted RESS of a secondary electric vehicle, e.g., a BEV other than the host vehicle. As a result, when a plug-in connection is made to the AC charging inlet of the host vehicle, an onboard controller of the host vehicle quickly differentiates between connection of an offboard EVSE charging station, the V2L load connection box noted above, and the jump-charge cord set and EVSE charging cord set, with the latter possibility corresponding to the above-noted jump-charge use case.

The present teachings may be readily adapted to use aboard an electrified motor vehicles as well as battery-operated watercraft, aircraft, rail vehicles, mobile platforms, robots, etc. As system mobility is not necessarily required within the scope of the present disclosure, stationary systems such as powerplants may also be controlled in accordance with the present teachings. For illustrative consistency, however, as well as to detail particular advantageous use cases, the present teachings are explained in the context of a rechargeable BEV without limiting the teachings to such a configuration. For that reason, the host system of the present disclosure is referred to interchangeably herein as a host vehicle as noted elsewhere above.

The solutions detailed herein are directed to particular use cases in which an onboard rotary electric machine of the host vehicle is not actively generating torque, and in which the RESS of the host vehicle is not charging. At such times, electrical energy stored in the battery cells of the host vehicle's RESS remains available for powering other functions. For example, a user of the host vehicle may find it useful at times to have the option of connecting one of the above-described AC electrical devices into the AC charging inlet and, upon successful identification of the connected device using the present method, offloading power from the RESS to the externally-connected AC electrical device.

An illustrative use scenario is that of tailgating or camping. In such a scenario, the user may wish to temporarily power any number of AC discharge accessories, such as an electric grill, an oscillating fan, lights, a radio, or a television. Such AC discharge accessories could be plugged into the V2L load connection box via the V2L cord set and end connectors and thereafter powered by the RESS of the host vehicle. Similarly, a situation could arise in which a user of another/secondary electric vehicle experiences a depleted battery condition necessitating a jump-charge. The user of the host vehicle in this particular use case may choose to assist by connecting the host vehicle's AC charging inlet to a counterpart AC charging inlet of the secondary electric vehicle. This connection is made herein using a special purpose jump-charge cord set and EVSE charging cord set connected end-to-end. In either of these exemplary use cases, an electrical connection is first established between the AC charging inlet of the power-providing host vehicle and the external AC electrical device, the identity of which is then automatically determined by a controller of the host vehicle prior to offloading power from the RESS to the connected AC electrical device.

Once the external electrical connection is made, the present hardware and software-based control strategy together enable a vehicle integrated control module (VICM) or other suitable onboard controller of the host vehicle to automatically distinguish between the different types of AC electrical devices. Identification of the particular device occurs herein automatically using existing voltage signals, purposefully modulated or varied as set forth herein, with the proximity voltage and the control pilot voltage being two possible candidate voltage signals to be evaluated by the controller within the scope of the present disclosure.

According to an exemplary embodiment, a method for detecting an externally-connected AC electrical device via a host system having an RESS and an AC charging inlet connected thereto includes, while the AC charging inlet is electrically connected to the electrical device, detecting a control pilot voltage and a proximity voltage at a respective pilot voltage terminal and proximity voltage terminal of the AC charging inlet. When the control pilot voltage is zero volts, the method includes evaluating, via the controller, whether certain entry conditions are satisfied.

The entry conditions in this particular embodiment are indicative of a desire of a user of the host system to offload power from the RESS of the host system to the AC electrical device. In response to satisfaction of the entry conditions, the controller receives a modulated voltage signal from an EVSE charging plug of an EVSE charging cord set, or from a similar plug of a V2L cord set connected to the above-noted V2L load connection box, depending on the connection. The modulated voltage signal is a predetermined signal variation of the proximity voltage and/or the control pilot voltage. The method then includes comparing the modulated voltage signal, via the controller, to an expected voltage indicative of an identity of the external electrical load. Electrical power offloaded from the RESS to the external AC electrical device is thereafter enabled when the modulated voltage signal matches the expected voltage.

A host system is also disclosed herein. In a disclosed embodiment, the host system includes an RESS having a plurality of battery cells, an AC charging inlet, an onboard bi-directional inverter connected to the RESS, a measurement circuit, and a controller configured to execute the present method. The AC charging inlet has five voltage terminals, including a first line (L1) voltage terminal, a second/neutral line (L2/N) voltage terminal, a ground (G) voltage terminal, a control pilot (CP) voltage terminal, and a proximity (PRX) voltage terminal. The bi-directional inverter is connected to the RESS, the L1 voltage terminal, and the L2/N voltage terminal, and is configured to convert a DC voltage from the RESS to an AC voltage, and vice versa as needed. The measurement circuit is connected to the G, CP, and PRX voltage terminals, and is configured to measure a CP voltage and a PRX voltage.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations of the elements and features presented above and below.

DETAILED DESCRIPTION

Figure 1:
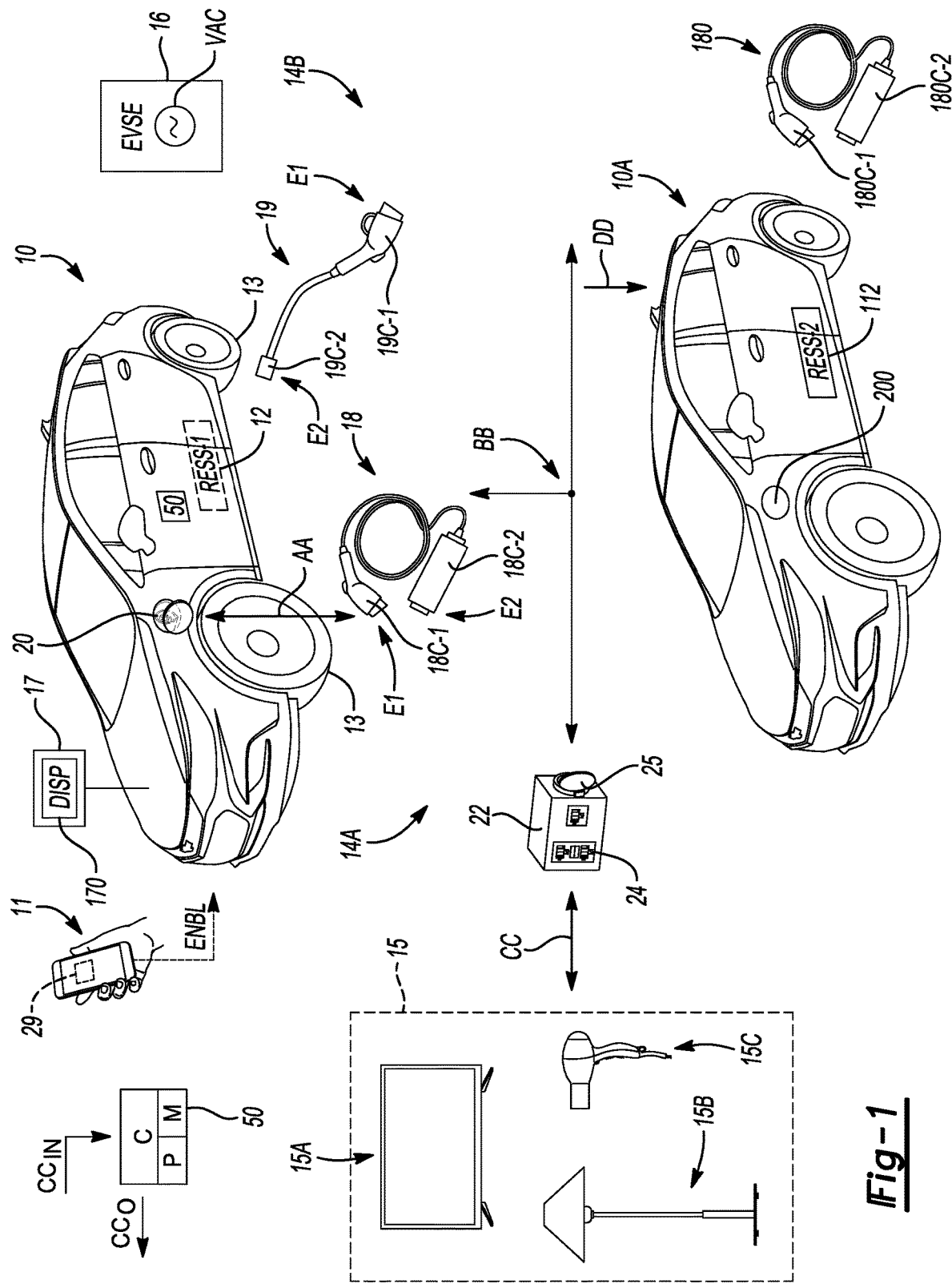
FIG. 1 is a schematic illustration of a representative electrified host system in the form of a battery electric vehicle configured to automatically identify an externally-connected alternating current (AC) electrical device and thereafter offload power to the connected device in accordance with the disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like features throughout the several views, an electrified host system 10 is depicted schematically in FIG. 1 in the representative/non-limiting form of a motor vehicle having road wheels 13. In other embodiments, the host system 10 may be another type of mobile platform such as a watercraft, an aircraft, a rail vehicle, etc. Alternatively, the host system 10 may be stationary, with the host system 10 in its wide range of possible mobile or stationary embodiments including a multi-cell rechargeable energy storage system (RESS-1) 12, power from which is situationally offloaded upon successful detection of an alternating current (AC) electrical device 14A or 14B as set forth below. For descriptive consistency, the host system 10 is referred to hereinafter as a host vehicle 10 without limitation.

In particular, electrical energy stored in a plurality of electrically-interconnected electrochemical battery cells 12C (see FIGS. 3-5) of the RESS 12 could be made situationally available for offboard use when powering the external AC electrical device 14A or 14B at the discretion of a user of the host vehicle 10. Within the scope of the present disclosure, for instance, the RESS 12 located aboard the host vehicle 10 could be selectively connected to the AC electrical device 14A or 14B. The electrical device 14A may be configured as one or more different nominal 120V AC discharge accessories 15A, 15B, or 15C. In contrast, the electrical device 14B may be embodied as a nominal 240V or other higher-voltage AC discharge device ultimately coupled to an RESS 112 (RESS-2), e.g., of an electrified secondary vehicle 10A. Thus, when powered by the RESS 12, the connected AC electrical devices 14A and 14B would present different loads, and thus would require different power control strategies. When not offloading energy, the RESS 12 of the host vehicle 10 remains capable of being recharged by an external electric vehicle supply equipment (EVSE) charging station 16. Variations of the EVSE charging station 16 are able to output an AC charging voltage (VAC), and possibly a DC charging voltage (not shown) or both, as is well understood in the art of EV charging operations.

Also as appreciated in the art, the charging of an electric vehicle is performed in accordance with country-specific standards, with SAE J1772 being the relevant North American standard setting forth the required electrical hardware and communication protocols to be used when conducting a vehicle charging event. While J1772 is used herein for the purpose of illustrating the present teachings and associated voltage terminal/pin configurations within the non-limiting exemplary context of automotive charging, i.e., with the electrified host system 10 being a motor vehicle and therefore referred to hereinafter as host vehicle 10, the present control strategy may be adapted for use with other relevant standards, such as but not limited to the Combined Charging System (CCS), CHAdeMO, etc.

With respect to the exemplary AC electrical device 14A, relevant examples include any number of devices that a user of the host vehicle 10 may at times wish to power when the host vehicle 10 is not running. In the tailgating or camping scenarios noted above, for instance, the user may wish to offload power from the RESS 12 to run a television, reading lights, or hairdryer as respectively shown for representative AC accessories 15A, 15B, and 15C. Other possible embodiments of the AC electrical device 14A include radios, oscillating fans, coolers, heaters, electric grills, and the like, and therefore the illustrated examples of FIG. 1 are representative of the present approach and non-limiting.

To this end, a first end plug 18C-1 is located on a first distal end E1 of a vehicle-to-live (V2L) cord set 18, e.g., a portable J1772 electrical connector and associated electrical cabling as shown. Such a configuration may be used to selectively connect receptacles or terminals of an EVSE/AC charging inlet 20 of the host vehicle 10 to a V2L load connection box 22 configured as described herein. The electrical device 14A can be plugged into a respective AC power outlet 24 of the V2L load connection box 22, either directly or using an extension cord (not shown), as indicated by double-headed arrow CC. Such a V2L cord set 18 includes first and second distal ends E1 and E2, with the first distal end E1 with first end plug 18C-1 being connected to the AC charging inlet 20 as indicated by double-headed arrow AA, and with the distal end E2 with a second end plug 18C-2 being connected to a corresponding terminal block 25 of the V2L load connection box 22. In this manner, electrical energy from the RESS 12 residing aboard the host vehicle 10 may be selectively used for powering the connected electrical device 14A via the intervening V2L load connection box 22 and the accompanying V2L cord set 18.

Another connection scenario is that of jump-charging, which occurs when the user of the host vehicle 10 wishes to connect the AC charging inlet 20 to a counterpart AC charging inlet 200 located on the secondary vehicle 10A. In this case, two different charging cord sets may be used, i.e., a special purpose jump-charge cord set 19 and an EVSE charging cord set 180, each having respective first and second distal ends E1 and E2. First distal end E1 of the jump-charge cord set 19 is plugged into the AC charging inlet 20 of the host vehicle 10, with second distal end E2 of the same cord set 19 connected to the second distal end E2/end plug 180C-2 of the EVSE charging cord set 180. The first distal end E1 of the EVSE charging cord set 180 is then connected to AC charging inlet 200 of the secondary vehicle 10A to complete the connection of host vehicle 10 to the secondary vehicle 10A, with the jump-charge cord set 19 in this instance acting as or as part of the AC electrical device 14B. The alternative connection of the RESS 12 to the electrical loads 14A or 14B is indicated schematically in FIG. 1 by triple-headed arrow BB.

For both of these use cases, an onboard controller 50 of the host vehicle 10, e.g., a vehicle integrated control module or VICM, is configured to detect and identify the AC electrical device 14A or 14B and thereafter limit discharge of the RESS 12 in accordance with predetermined or user-selected and/or calculated state of charge (SOC) limits, possibly set via an enabling signal (arrow ENBL) from a mobile device 11 and/or a vehicle-integrated device 17. This capability ensures that sufficient SOC remains for reaching the user's next destination and/or a closest-available EVSE charging station 16. To enable user-selectable features, possibly including selectively enabling execution of a method 100 of FIG. 6 by the controller 50 and/or selecting the above-noted SOC thresholds to apply for a given discharging operation, aspects of the method 100 may be encoded as a computer-executable application ("app") 29 accessible by the user via the mobile device 11, e.g., a smartphone as shown, and/or by accessing a display screen (DISP) 170 of the integrated device 17 of the host vehicle 10, such as a touch screen of an infotainment or navigation system. To that end, entry conditions for executing the method 100 or for performing the method 100 in a desired manner may include receipt of the enabling signal (arrow ENBL) by the controller 50.

Figure 6:
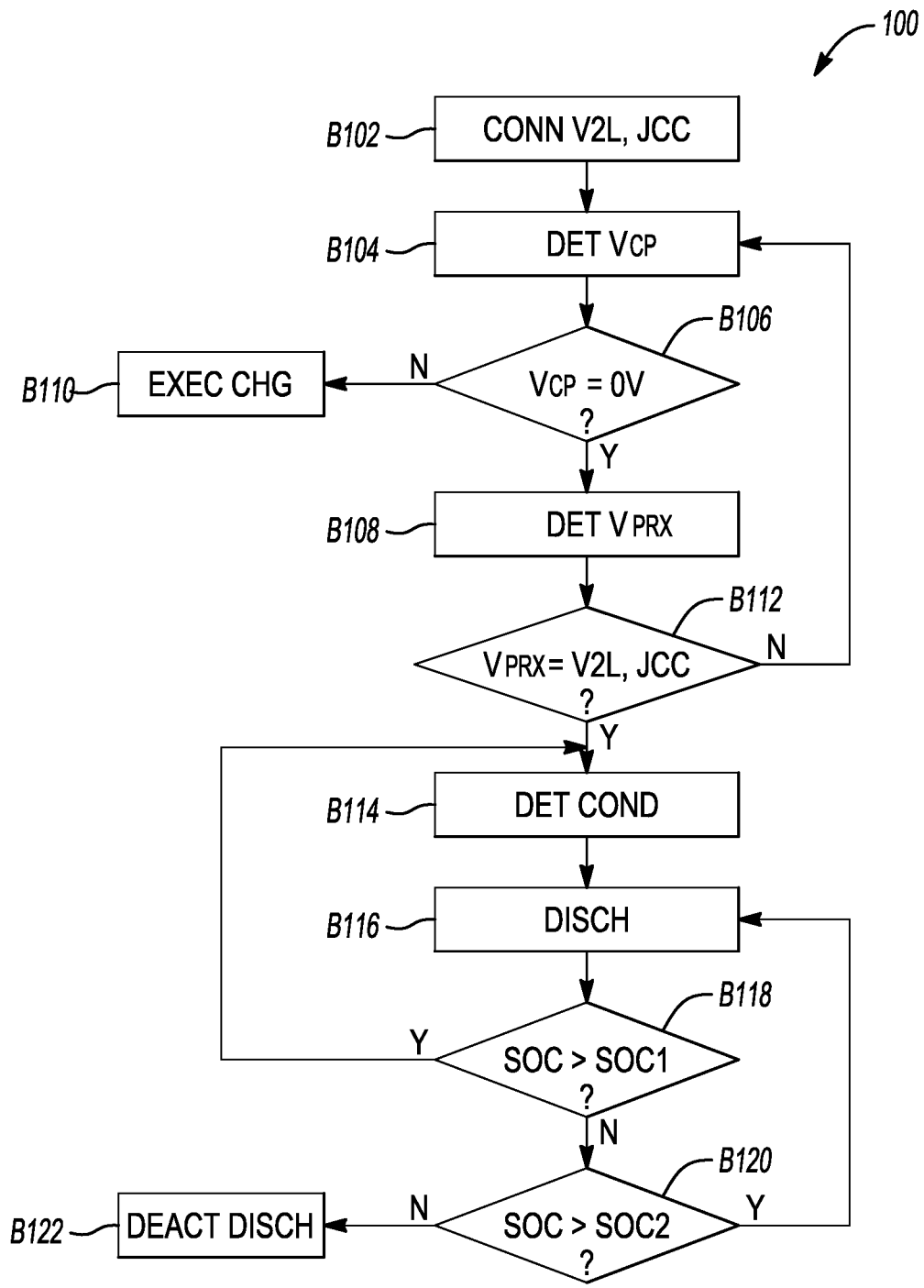
FIG. 6 is a logic flow diagram describing a possible embodiment of a control method for use aboard the host system shown in FIG. 1.

Still referring to FIG. 1, the controller 50 receives input signals (arrow $CC_{IN}$) and transmits output signals (arrow $CC_O$) in the course of performing the method 100. Accordingly, the controller 50 is configured to accurately detect the above connection of the AC electrical device 14A or 14B to the AC charging inlet 20 of host vehicle 10 using the method 100, a non-limiting/exemplary embodiment of which is shown in FIG. 6 and described below. After successful detection, the controller 50 offloads electrical power from the RESS 12 to the identified AC electrical device 14A or 14B.

For the purposes of executing the present method 100, the controller 50 is equipped with application-specific amounts of the volatile and non-volatile memory (M) and one or more of processor(s) (P), e.g., microprocessors or central processing units, as well as other associated hardware and software, for instance a digital clock or timer, input/output circuitry, buffer circuitry, Application Specific Integrated Circuits (ASICs), systems-on-a-chip (SoCs), electronic circuits, and other requisite hardware as needed to provide the programmed functionality. The controller 50 is in communication with the RESS 12, and thus is aware of the present SOC thereof, distances to available EVSE charging stations 16, and with a corresponding measurement circuit 50L as set forth below with reference to FIGS. 3-5.

Figure 2:
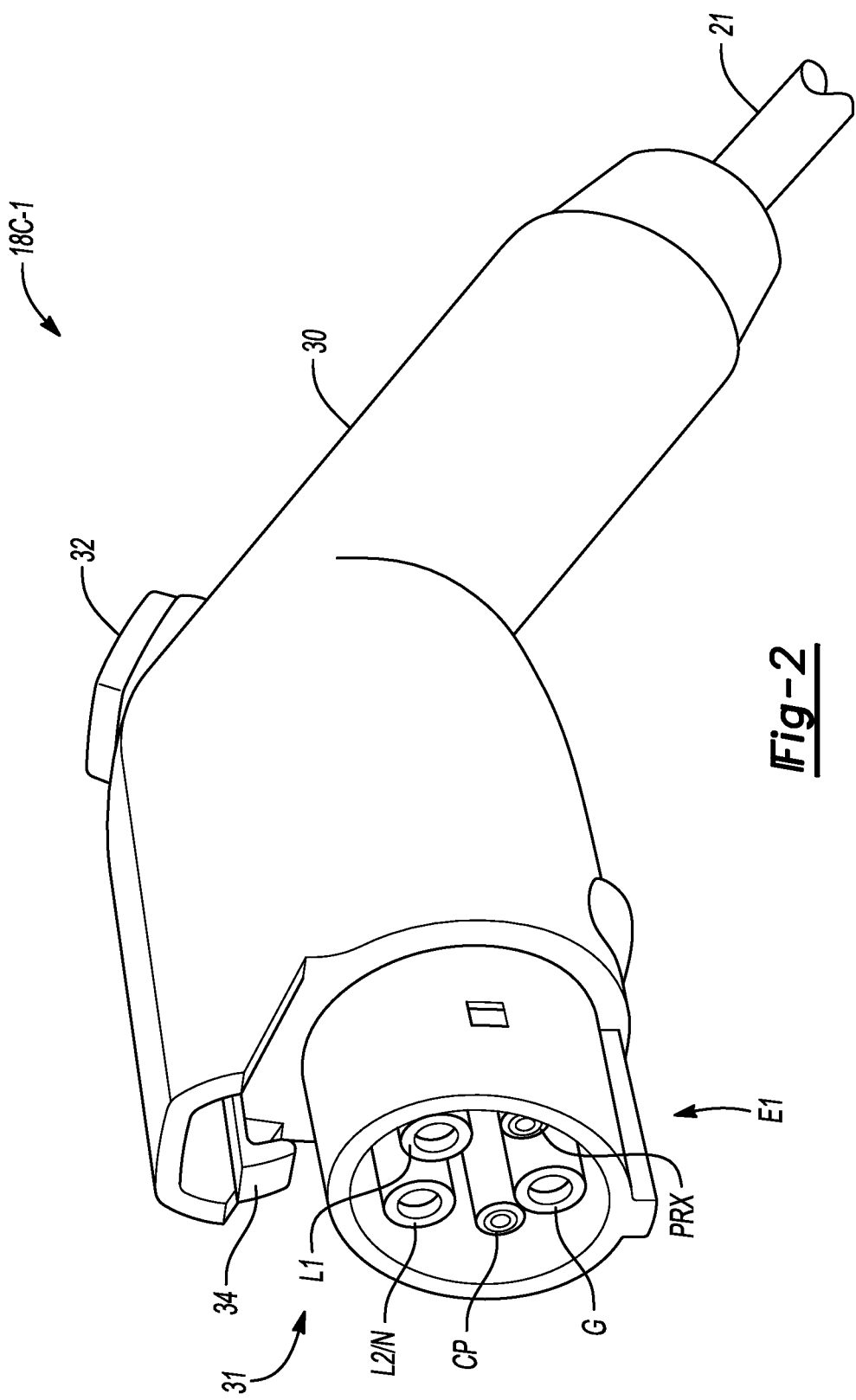
FIG. 2 is a schematic perspective view illustration of a representative electric vehicle supply equipment (EVSE) charging plug according to an embodiment, and voltage terminals used by an onboard controller of the host system shown in FIG. 1 in performing the present method.

Referring briefly to FIG. 2, the method 100 and the controller 50 of the present disclosure provide an integrated hardware and control software strategy that together enable a user of the host vehicle 10 of FIG. 1 to discharge energy from the RESS 12 whenever the AC electrical device 14A or 14B is plugged into the AC charging inlet 20 and successfully identified. In an EV context, the primary purpose of the AC charging inlet 20 is to facilitate an electrical connection to the EVSE charging station 16 of FIG. 1. To that end, the EVSE charging station 16 is ordinarily equipped an EVSE charging plug similar to the depicted end plug 18C-1, which in turn is coupled to the EVSE charging station 16 via an electrical cable 21.

For the illustrated exemplary J1772 configuration, the EVSE charging plug and the end plug 18C-1 used herein terminates a length of cable 21 at a charging handle 30, with the charging handle 30 arranged at the first distal end E1. As appreciated in the art, such a charging handle 30 includes a terminal end plug 31 with separate pins for voltage lines 1 (L1), 2/neutral (L2/N), and ground (G) in a typical single-phase configuration. Two additional pins CP and PRX are included to conduct a control pilot voltage and a proximity voltage, respectively. A latch button or trigger 32 is disposed on top of the connector handle 30, with a responsive latch 34 disposed adjacent to the terminal end plug 31. When activated by the latch trigger 32, the latch 34 securely engages mating structure of the AC charging inlet 20 located on the host vehicle 10 of FIG. 1, thereby ensuring the end plug 18C-1 remains attached during a charging or offloading event.

Detection Based on $V_{CP}$ and $V_{PRX}$: within the scope of the present disclosure the controller 50 shown schematically in FIG. 1 is configured to execute the instructions embodying the method 100 to cause the processor (P) to automatically detect a plug-in connection of the AC electrical device 14A or 14B to the AC charging inlet 20. Because the EVSE charging station 16 could likewise be connected in the ordinary course of initiating a normal EV charging event, the controller 50 uses resident logic and the associated measurement circuit 50L of FIGS. 3, 4, and 5 to eliminate the possibility that the connected external device is actually the EVSE charging station 16. Additionally, the controller 50 automatically differentiates between the different AC electrical devices 14A and 14B based on a unique modified or modulated corresponding voltage signal, i.e., the proximity and/or the control pilot voltages in different embodiments, with possible activation of the latch trigger 32 of FIG. 2.

In the various embodiments described below, for example, a connection to the EVSE charging station 16 of FIG. 1 would result in voltage signals corresponding to a charging state voltage, which is outside of the scope of the present disclosure. Connection to the V2L load connection box 22 of FIG. 1, however, results in a different second modulated voltage signal as disclosed herein. Likewise, connection of the higher-voltage AC electrical device 14B in a jump-charge scenario results in a third modulated voltage signal, with the first, second, and third modulated voltage voltages each being unique in order to enable the controller 50 to quickly and accurately distinguish between them prior to enabling power flow to or from the RESS 12.

Figure 3:
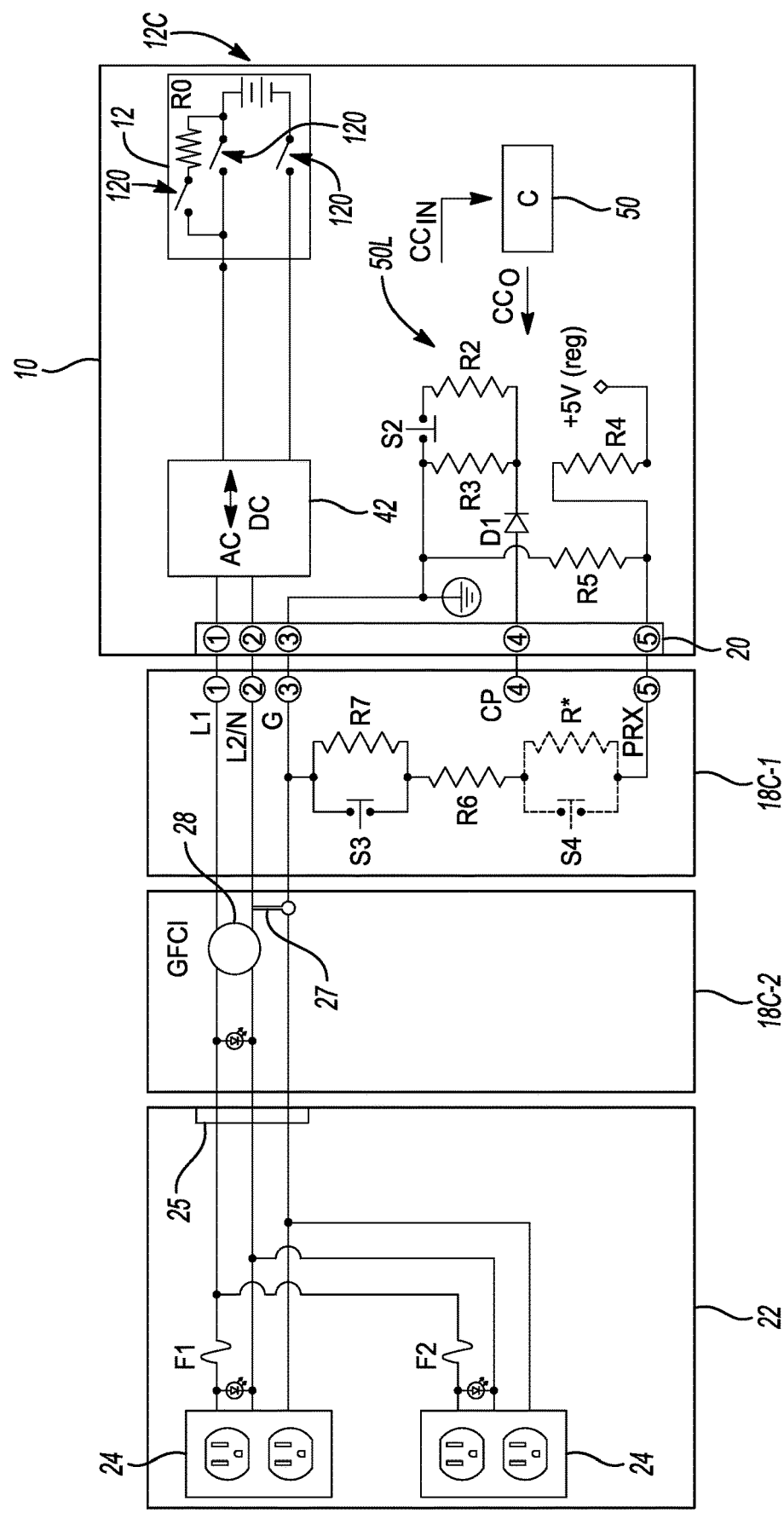
FIGS. 3 and 4 illustrate alternative circuit topologies for implementing an exemplary use case in which the externally-connected AC electrical device is an AC discharge accessory, with the connection being via an intervening vehicle-to-live (V2L) load connection box and accompanying V2L cord set.
Figure 4:
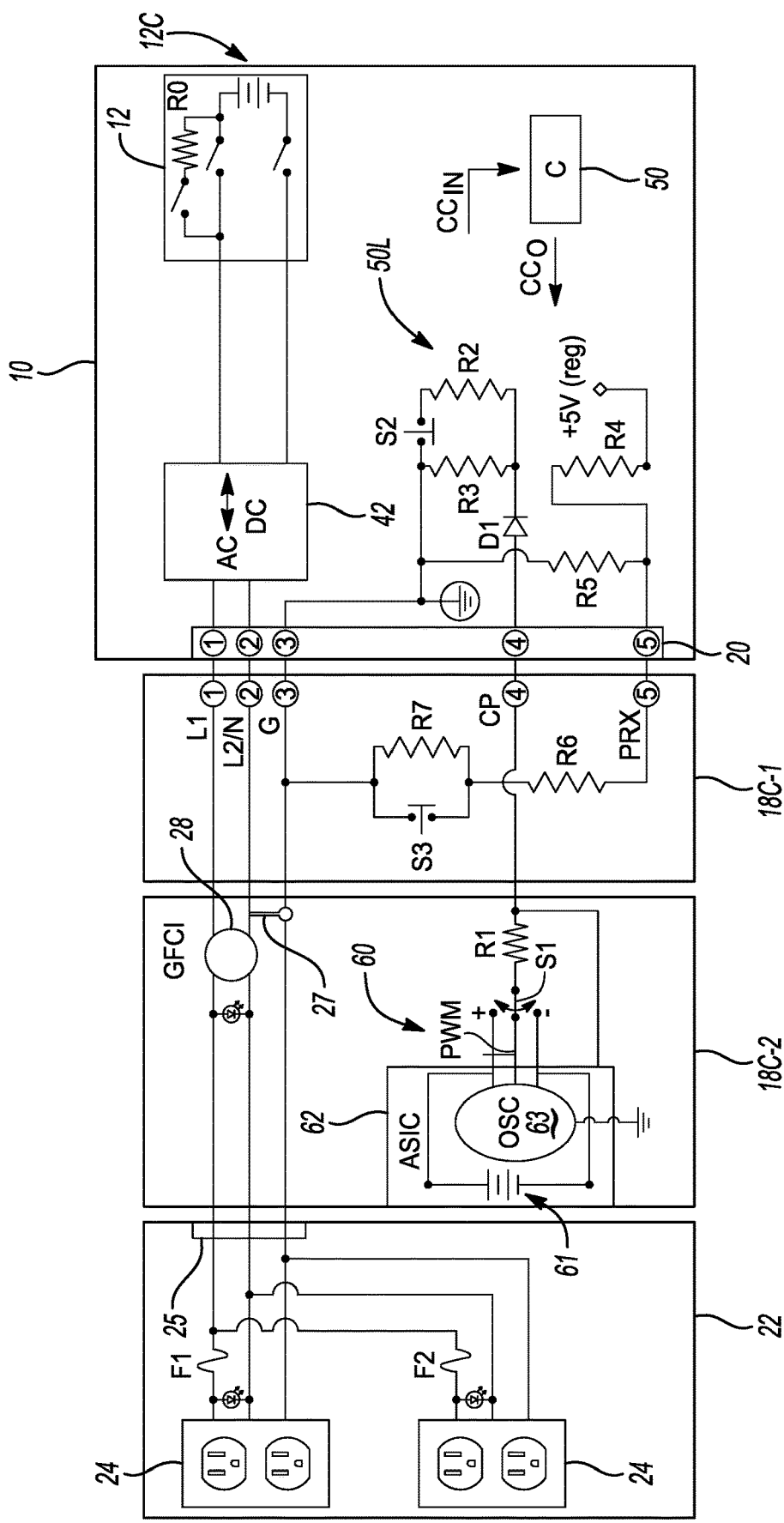
Figure 5:
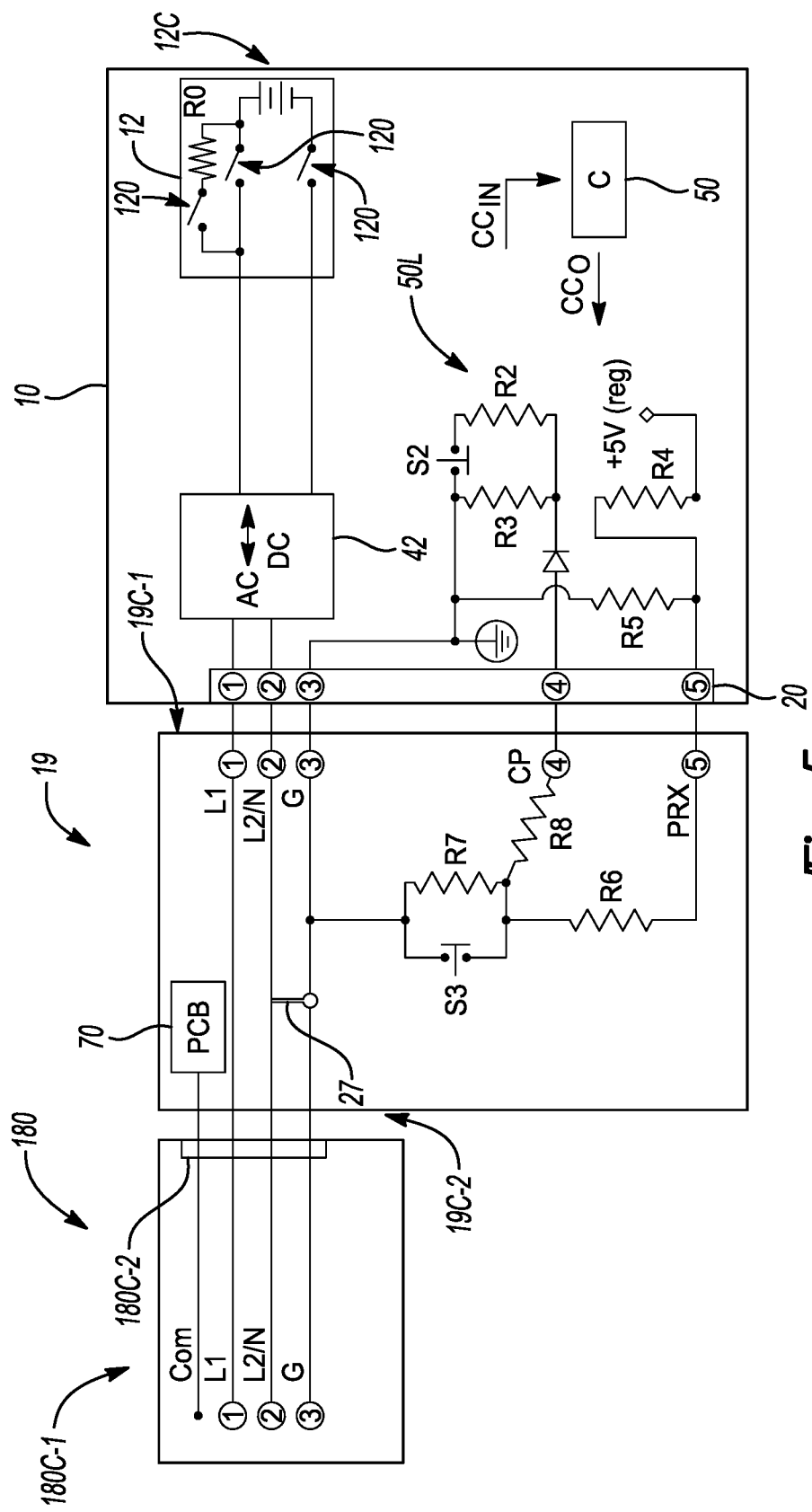
FIG. 5 is a schematic electric circuit topology for implementing a jump-charge use case in which the externally-connected AC electrical device includes an EVSE charging connector and associated cord set.

By using the representative circuit topologies of FIGS. 3, 4, and 5 in accordance with the method 100 shown in FIG. 6, the controller 50 automatically detects the particular AC electrical device 14A or 14B when connected to the AC charging inlet 20, as noted above, and thereafter takes the necessary actions for initiating and regulating power offloading functionality. In doing so, the controller 50 automatically detects a desired output voltage from the RESS 12 through the existing proximity and/or control pilot circuitry. The controller 50 may also automatically terminate the described discharging mode before depleting the RESS 12 to thereby allow the user to reach a nearest EVSE charging station 16 and/or a next destination. Exemplary circuit topologies for implementing the present teachings, including detecting specific voltages and/or PWM duty cycles for the purpose of identifying the AC electrical device 14A or 14B, will now be described with reference to FIGS. 3-5.

USE CASE #1—VEHICLE-TO-LIVE (V2L) and AC ACCESSORY: referring now to FIG. 3, the above-described use case in which the host vehicle 10 of FIG. 1 is electrically connected to the AC electrical device 14A, e.g., in the form of one of the AC discharge accessories 15A, 15B, and/or 15C, may be implemented via the V2L load connection box 22, which itself is inclusive of the V2L load connection box 22 and a V2L cord set 18 connected thereto. The RESS 12 is schematically represented to include its various battery cells 12C, a pair of high-voltage contactors 120, and a current limiting resistor (RO). The RESS 12 is electrically connected to a bi-directional inverter 42. As indicated by double-headed arrows AC DC, the bi-directional inverter 42 is configured to convert AC to DC and vice versa as needed, depending on whether the bi-directional inverter 42 is used in a charging application or, within the scope of the present disclosure, when discharging.

Portions of the host vehicle 10 shown schematically in FIG. 3 include the present controller 50 and the measurement circuit 50L, the latter of which is internally connected to voltage terminals (3), (4), and (5) of the AC charging inlet 20, with voltage terminal (3) corresponding to electrical ground/G, voltage terminal (4) carrying the control pilot voltage/CP, and voltage terminal (5) carrying the proximity voltage/PRX. The remaining two terminals, i.e., voltage terminal (1) L1 and voltage terminal (2) L2/N, are connected to the bi-directional inverter 42.

With respect to the measurement circuit 50L, various resistors R2, R3, R4, and R5 having predetermined Ohmic resistance values are arranged as shown, with the resistors R2 and R3 being connected in parallel. An electrical switch S2, which is open when performing the indicated accessory functions, is disposed between terminals of the parallel resistors R2 and R3. The control pilot voltage terminal (4) is connected to an anode of a steering diode D1, the cathode of which is connected to the remaining terminals of resistors R2 and R3. Resistor R5 is connected between the proximity voltage terminal (5) and to electrical ground (G), i.e., voltage terminal (3) of the AC charging inlet 20, with resistor R4 being connected in series between the PRX voltage terminal (5) and a regulated (ref) low-voltage source, e.g., +5V.

Within the end plug 18C-1 of the V2L cord set 18 shown in FIG. 1, a manually-controlled switch S3 is in parallel with another resistor R7 as shown, with terminals of the switch S3 and the resistor R7 connected to the ground terminal (3). As explained below, in a possible configuration the switch S3 may be connected to or integrally constructed with the latch trigger 32 of FIG. 2, and thus selectively opened or closed by operation of the latch trigger 32. Other embodiments employ another optional switch S4, shown in phantom line in parallel with a resistor R*, externally located with respect to the latch trigger 32, and having an open/closed state independent of a corresponding open/closed state of the latch trigger 32. When integral with the latch trigger 32, the switch S3 may be pressed and released according to a predetermined sequence to help modulate a low-voltage signal for identifying the connected AC electrical device 14A.

Opposing terminals of such a switch S3 and the resistor R7 are connected to a terminal of a resistor R6, with the opposing terminal of resistor R6 tied to the PRX voltage terminal (5) carrying the proximity voltage. Thus, when end plug 18C-1 is plugged into the AC charging inlet 20, voltage terminals (1)-(5) of the end plug 18C-1 engage or mate with voltage terminals (1)-(5) of the AC charging inlet 20 to establish the various electrical connections shown in FIG. 3. While the particular resistance levels of resistors R6 and R7 may vary with the intended application, the exemplary embodiment of FIG. 1 may see representative resistance levels of 150Ω and 330Ω, respectively, for a representative nominal 120V polyphase embodiment of the electrical load 14A.

Still referring to FIG. 3, the V2L load connection box 22 includes multiple AC power receptacles 24, e.g., typical three-terminal NEMA receptacles with integrated fuses F1 and F2 forming AC circuit breakers. Within the V2L load connection box 22, ports of such receptacles 24 correspond to voltage Lines 1, 2, and ground (L1, L2/N, and G, respectively). To conduct an AC single-phase output, the V2L cord set 18 of FIG. 1 terminates in a connection to described end plug 18C-2 via the terminal block 25. A ground fault circuit interrupter (GFCI) circuit 28 may be tied to Lines L1 and L2/N. To further satisfy GFCI requirements, an equipment ground may be created near the end plug 18C-1 by connecting the high-voltage neutral (N) line to ground (G), e.g., via a conductive shunting member 27.

As noted above, the switch S3 may be held in/released according to a predetermined sequence to signal the connection of the AC electrical device 14A. More specifically, activation of the switch S3 by a user via toggling of the latch trigger 32 (FIG. 2) may be used for modulation, in a highly generalized sense, thus providing a unique voltage signal on the proximity (PRX) voltage line to terminal (5). The unique modulated voltage signal may be used by the controller 50 to identify the desired AC output voltage to offload to the connected AC electrical device 14A. The controller 50 may therefore read the proximity voltage at terminal (5) to determine the identity the connected AC electrical device 14A.

Alternatively, the optional separate switch S4 may be placed in series between the resistor R6 and voltage terminal (5), i.e., the proximity voltage terminal. Such a switch S4 may be used to toggle or modulate the proximity voltage without requiring activation of the switch S3. Benefits of using such a switch S4 include a unique affirmative sequence of the user to enter the discharge state, which cannot be confused with a desired latching action, as well as enabling the present strategy across regions in which switch S3 is not used.

Referring briefly to FIG. 5, discussed in detail below, a similar end effect may be enjoyed by connecting another resistor R8 to the CP voltage terminal (4), i.e., the particular terminal carrying the control pilot voltage. Using the resistor R8 as a sensor, the controller 50 could effectively measure a current passing through the resistor R8 to help identify the connected AC electrical device 14A, without requiring the user to manipulate the switches S3 or S4 of FIG. 3 in the above-described manner. As will be appreciated, connection of the resistor R8 at the indicated circuit location would change the proximity voltage at voltage terminal (5). Thus, use of the resistor R8 at this location would require an appropriate increase in the resistance level of resistor R6 to provide an accurate measurement. However, passive detection enabled by resistor R8 would help eliminate the need for manual switch activation, and thus is useful in some applications.

Referring now to FIG. 4, in yet another V2L embodiment, an optional active pilot control circuit 60 having control electronics in the form of an application-specific integrated circuit (ASIC) 62 with an oscillator (OSC) 63 may be integrated into the end plug 18C-2 of the V2L cord set 18 (see FIG. 1). The pilot control circuit 60 may be configured to actively vary or modulate a control pilot frequency, e.g., via pulse width modulation (PWM), with such actions powered by a low-voltage battery (BAT) 61, e.g., a 5V battery. The unique modulated frequency and/or voltage could thus indicate which one of the AC electrical devices 14A or 14B has been connected. For example, the ASIC 62 could use the oscillator 63 to output a 500 Hz signal indicative of the AC electrical device 14A, a 750 Hz signal indicative of the AC electrical device 14B, and 1 kHz for a typical EVSE charging operation in which the host vehicle 10 is connected to the EVSE charging station 16. Such frequencies are representative and non-limiting, with actual values possibly being different, provided sufficient separation exists between the various frequencies.

USE CASE #2—JUMP-CHARGE: referring now to FIG. 5, the present teachings may be applied in the above-described jump-charge ("Jmp-Chg") use case in which a user of the host vehicle 10 shown in FIG. 1 wishes to offload energy from the RESS 12 of the host vehicle 10 to the RESS 112 of the secondary vehicle 10A. Such a connection may entail connecting the jump-charge cord set 19 of FIG. 1 to the EVSE charging cord set 180. That is, end plug 19C-2 of the jump-charge cord set 19 is connected to end plug 180C-2 of the EVSE charging cord set 180, with the opposing end plug 180C-1 in turn plugged into the AC charging inlet 200 of the secondary electric vehicle 10A.

In the illustrated jump-charge setup of FIG. 5, power offloading will eventually occur at a higher voltage level relative to that which was used in the AC accessory use case of FIGS. 3 and 4. Accordingly, the specially configured jump-charge cord set 19 may be used for the jump-charge use case by including internal resistors R6 and R7 having different values relative to the counterparts in FIGS. 3 and 4. In a typical jump-charge action, a user of the host vehicle 10 connects the end plug 19C-1 of the jump-charge cord set 19 into the AC charging inlet 20. The opposing end of the jump-charge cord set 19 terminates in end plug 19C-2, which is then connected to end plug 180C-2 of the EVSE charging cord set 180. An electrical connection is thus made with voltage terminals (1), (2), and (3), i.e., L1, L2/N, and G.

Also connected at this stage are mutual communication (Com) ports of the EVSE charging cord set 180 and the jump-charge cord set 19, with a communications printed circuit board (PCB) 70 of the latter being connected to the Com port and configured, as understood in the art, to monitor and coordinate two-way communication between the secondary electric vehicle 10A and the host vehicle 10.

Activation of the switch S3 for use in the illustrated circuitry topology, or of the optional separate switch S1 of FIG. 4, may be manually sequenced in such a way as to communicate a unique/modulated proximity (PRX) voltage to the proximity voltage terminal (5). Again, the triggering sequence may be predetermined to provide a desired voltage effect, such as a press-and-hold action that is sustained for a calibrated duration, a quick double press-and-release operation, etc. The proximity voltage is then read and interpreted by the controller 50 as an identity of the connected AC electrical device 15B, as set forth above. To provide a corresponding proximity voltage indicative of the jump-charge case, the resistors R6 and R7 may be set to a predetermined level, e.g., 51Ω and 430Ω, or other suitable values for indicating a desire to commence a jump-charge action. As with FIGS. 3 and 4, alternatives exist in which the control pilot voltage presented at terminal (4) is modulated to correspond to the connected device, in this instance the secondary vehicle 10A of FIG. 1, or more precisely the resident RESS 112 thereof.

The various circuit topologies described above with reference to FIGS. 3, 4, and 5 may be controlled in accordance with the present method 100. In general terms, possible embodiments of the method 100 operate while the AC charging inlet 20 of the host vehicle 10 is electrically connected to the external AC electrical device 14A or 14B of FIG. 1. When this connection is established, the controller 50 automatically detects the control pilot (CP) voltage and the proximity (PRX) voltage present at the respective pilot and proximity voltage terminals of the AC charging inlet 20. When the control pilot voltage is zero volts (0V), the controller 50 evaluates whether entry conditions are satisfied, e.g., by processing the enable signal (arrow ENBL) of FIG. 1, with such entry conditions being indicative of a desire of a user of the host vehicle 10 to offload power from the RESS 12 to the AC electrical device 14A or 14B.

In response to satisfaction of the entry conditions, the controller 50 receives the above-described modulated voltage signal, with the modulated voltage signal being a predetermined signal variation of the proximity voltage and/or the control pilot voltage in different possible embodiments. The controller 50 then compares the modulated voltage signal to an expected voltage indicative of an identity of the AC electrical device 14A or 14B. Once the device 14A or 14B has been properly identified, the controller 50 and thereafter offloads electrical power from the RESS 12 across the intervening conductors of the cord set 18 or 180, when the modulated voltage signal matches the expected voltage. Configuration of the controller 50 enables the controller 50 to automatically distinguish between the AC accessory, e.g., 15A, 15B, or 15C of FIG. 1 or another 120V AC accessory, on one hand, and the jump-charge cord set 19 and EVSE charging cord set 180 on the other hand, with the controller 50 doing so when the modulated voltage signal matches different corresponding expected voltages.

Referring to FIG. 6, a non-limiting exemplary embodiment of the method 100 commences at block B102, where the AC electrical device 14A or 14B is connected to the AC charging inlet 20 of the host vehicle 10 shown in FIG. 1. As the connection of the AC electrical device 14B corresponds to a jump-charge connection ("JCC") use case, logic block B102 is abbreviated "CONN V2L, JCC" for clarity. As part of logic block B102, voltage terminals (1)-(5) of the AC charging inlet 20 receive therein respective mating pins of either the portable V2L cord set 18 or the jump-charge cord set 19. The opposing end of the V2L cord set 18 is connected to the V2L load connection box 22 (FIGS. 3 and 4), while in the jump-charge case the jump-charge cord set 19 is connected to the AC charging inlet 200 via the intervening EVSE charging cord set 180. The method 100 then proceeds to block B104.

At block B104, the controller 50 detects the pilot control voltage ($V_{CP}$). As shown in FIGS. 3 and 4, for instance, the pilot control voltage is present at voltage terminal (4), and can be read by the controller 50 using the associated measurement circuitry 50L. The method 100 proceeds to block B106 once the pilot control voltage has been measured.

At block B106, the controller 50 next determines whether the pilot control voltage measured at block B104 is 0V, which is the expected voltage value prior to performing power offloading to a non-energized device such as the AC electrical devices 14A and 14B. In an EVSE charging scenario, however, i.e., one in which the host vehicle 10 is plugged into the representative offboard EVSE charging station 16 of FIG. 1, the pilot control voltage is predetermined non-zero value. The method 100 proceeds to block B110 when the pilot control voltage is non-zero, with the method 100 proceeding instead to block B108 when the pilot control voltage is the expected 0V.

Block B108 includes detecting the proximity voltage ("DET $V_{PRX}$") via the controller 50, such as by reading the corresponding voltage at terminal (5) shown in FIGS. 3-5. The method 100 proceeds to block B112 once the proximity voltage has been ascertained by the controller 50.

Block B110 includes, in response to detection of a non-zero pilot control voltage at block B106, executing normal plug-in charging functions ("EXEC CHG"). Such an operation is conducted when the detected non-zero pilot control voltage corresponds to a predetermined charging value, according to existing region-specific charging protocols, and continues according to such charging protocols. The method 100 is complete.

At block B112, the controller 50 next compares the proximity voltage ($V_{PRX}$) from block B108 to corresponding values for initiating power offloading to the AC electrical device 14A or 14B, either via the V2L load connection box 22 or the jump charge cord set 19. As described above, the V2L connection is conducted at 120V AC in a typical embodiment, while AC voltage in the jump-charge case may be about 240V AC, or otherwise sufficiently different in magnitude from the discharging accessory use case. Thus, the proximity voltage for each use case is uniquely set in memory (M) of the controller 50 to enable the controller 50 to quickly distinguish between the two possible connections, having previously eliminated the possibility that the connection could be the EVSE charging station 16 shown in FIG. 1. The method 100 then proceeds to block B114 when the proximity voltage matches one of the corresponding values for the AC electrical device 14A or 14B, with method 100 repeating block B104 in the alternative.

At block B114 of FIG. 5, the controller 50 next detects entry conditions ("DET COND") indicative of a desire to initiate power offloading from the RESS 12 to the connected AC electrical device 14A or 14B. Various approaches are described above, including detecting a particular activation sequence of the latch trigger 32 of FIG. 2 corresponding to an open/closed state of the connected switch S3 (FIGS. 3-5), or the optional additional switch S1 (FIG. 4), or passive detection when optional resistor R8 is employed. Alternative embodiments in which the detected voltage is the control pilot voltage in lieu of the proximity voltage are also possible, e.g., via operation of the circuit 60 of FIG. 4. The method 100 then proceeds to block B116.

Block B116 entails initiating the discharge mode ("DISCH"). The controller 50 thus regulates operation of the bi-directional inverter 42 as needed to deliver power from the cells 12C of the RESS 12 via voltage terminals (1) and (2) to the connected AC electrical device 14A or 14B. Method 100 proceeds to block B118 as this occurs.

Block B118 entails automatically verifying the current state of charge (SOC) of the RESS 12 during the ongoing discharge, and comparing the current SOC to a first calibrated threshold (SOC1), e.g., 60%-70% or another suitable application-specific value, with 100% corresponding to a fully-charged set of battery cells 12C and 0% corresponding to a fully-depleted state, as is well understood in the art. The method 100 proceeds to block B120 when the current SOC drops below the first calibrated threshold (SOC1). When the current SOC remains above the first calibrated threshold, the controller 50 performs block B114, B116, and B118 in a loop as long as the current SOC remains above the first calibrated threshold (SOC1), or until the user discontinues the offloading operation before reaching such a threshold.

At block B120, the controller 50 may determine a distance to a nearest available EVSE charging station 16 and/or next destination. Such locations may be recorded in memory of the controller 50 as fixed geolocations in a lookup table that the controller 50 can quickly reference, or the controller 50 can determine the distance in real-time via communication with an onboard navigation system, the user's mobile device 11 (FIG. 1), etc. As a user of the host vehicle 10 typically uses an outlet located in the user's garage or residence to charge the RESS 12, the user's residence may be considered when ascertaining which charging station is most proximate.

As part of block B120, the controller 50 may automatically derive the required SOC (SOC2) for traveling the distance. As distance/location is static through the discharge mode, and as SOC is dynamically changing during discharge, the corresponding SOC2 needed for reaching the destination is used as SOC2. Block B120 may also ascertain the user's next destination, either via prompting the user prior to commencing offloading operations or automatically using past driving history, e.g., via the above-noted navigation or infotainment systems. If based on the above-noted distance the controller 50 determines that the current state of charge exceeds the state of charge (SOC2) needed for reaching the next destination ("SOC>SOC2"), the method 100 repeats block B116. Otherwise, the method 100 proceeds to block B122.

Block B122 of FIG. 5 includes automatically deactivating discharging operations ("DEACT DISCH") when the specified SOC limit is reached. As block B122 could be reached from blocks B120 or B122, the particular triggering threshold could be the first threshold (SOC1) or the second threshold (SOC2). The method 100 is complete once discharging operations have been terminated. The user thereafter disconnects the electrical load 14A or 14B from the EV charging port 20, with the host vehicle 10 thereafter ready to resume normal driving operations.

Using the method 100 of FIG. 6 and the controller 50 shown in FIG. 1 in conjunction with the various circuit implementations illustrated in FIGS. 3-5, the present teachings provide a number of benefits. To satisfy high-voltage isolation requirements, for instance, the described strategy enables discharge of the RESS 12 to the connected AC electrical device 14A or 14B only when the controller 50 detects that the control pilot voltage is initially 0V, the proximity voltage is in a specific range, and discharge is enabled by the user of the host vehicle 10. The controller 50 is able to automatically detect the user's desired voltage level for powering the connected AC electrical device 14A or 14B, in this example 120V or 240V, respectively, using the magnitude of the proximity voltage.

Additionally, the present teachings allow the user to enable the discharge mode through the use of the J1772 connector trigger switch 32 of FIG. 2, such as using a double-click, press-and-hold, or other predetermined activation sequence, or of a separate switch S1 (FIG. 4) performing a similar function to alter the proximity voltage. Other embodiments allow the connected electrical load 14A or 14B to be automatically detected through temporary use of a specific control pilot voltage and/or PWM duty cycle from the V2L load connection box 22, which may be powered by the battery 61 of FIG. 4. Discharge of the RESS 12 is automatically discontinued upon reaching a predetermined SOC of the battery cells 12, with thresholds possibly set by the user or automatically based on proximity to a nearest charging station 16 and/or next destination. This approach in turn helps to ensure that the RESS 12 is not depleted to an extent that would preclude useful propulsion operations of the host vehicle 10.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for detecting an externally-connected alternating current (AC) electrical device via a host system having a rechargeable energy storage system (RESS) and an alternating current (AC) charging inlet connected to the RESS, the method comprising:

while the AC charging inlet is electrically connected to the AC electrical device via a vehicle-to-live (V2L) load connection box and a V2L cord set forming a V2L connection, or via a jump-charge cord set and an electric vehicle service equipment (EVSE) charging cord set forming a jump-charge connection, detecting a control pilot voltage and a proximity voltage at a respective pilot voltage terminal and proximity voltage terminal of the AC charging inlet;

when the control pilot voltage is zero volts, evaluating via the controller whether entry conditions are satisfied, the entry conditions being indicative of a desire of a user of the host system to offload power from the RESS to the AC electrical device;

in response to the entry conditions, receiving a modulated voltage signal via the controller from the V2L connection or from the jump-charge connection, the modulated voltage signal being a predetermined signal variation of the proximity voltage and/or the control pilot voltage;

identifying the AC electrical device via the controller, as an identified device, including comparing the modulated voltage signal to an expected voltage indicative of an identity of the AC electrical device; and offloading electrical power from the RESS to the identified device via the V2L connection or the jump-charge connection when the modulated voltage signal matches the expected voltage.

2. The method of claim 1, wherein the identified device is a 120V AC accessory device, and wherein offloading the electrical power from the RESS to the identified device occurs via the V2L connection when the modulated voltage signal matches the expected voltage.

3. The method of claim 1, wherein the identified device is a 240V AC accessory device, and wherein offloading the electrical power from the RESS to the identified device occurs via the jump-charge connection when the modulated voltage signal matches the expected voltage.

4. The method of claim 1, further comprising:
monitoring a current state of charge (SOC) of the RESS via the controller; and
automatically discontinuing the offloading of the electrical power from the RESS to the identified device when the current SOC is less than an SOC threshold.

5. The method of claim 4, wherein the host system is a host vehicle, the RESS includes a high-voltage propulsion battery pack of the host vehicle, and the AC charging inlet is an EVSE charging inlet, and wherein the current SOC is a current SOC of the propulsion battery pack.

6. The method of claim 5, further comprising:
determining, via the controller, a distance between the host vehicle and a nearest charging station or a next destination; and
automatically adjusting the SOC threshold based on the distance and the current SOC.

7. The method of claim 1, wherein the entry conditions include an enabling signal from a mobile device, or from an integrated device of the host system.

8. The method of claim 1, further comprising:
measuring the proximity voltage via the controller while a user of the host system toggles a switch of the V2L cord set or the jump-charge cord set.

9. The method of claim 8, wherein the V2L cord set or the jump-charge cord set includes a latch and a latch trigger configured to open and close the latch, the switch being connected to the latch trigger, the method further comprising: selectively opening or closing the switch by operating the latch trigger.

10. The method of claim 8, wherein the V2L cord set or the jump-charge cord set includes a latch and a latch trigger configured to open and close the latch, and wherein the switch is external to the latch trigger and has an open/closed state that is independent of a corresponding open/closed state of the latch trigger.

11. A host system comprising:
a rechargeable energy storage system (RESS) having a plurality of battery cells;
an alternating current (AC) charging inlet having five voltage terminals, including a first line (L1) voltage terminal, a second/neutral line (L2/N) voltage terminal, a ground (G) voltage terminal, a control pilot (CP) voltage terminal, and a proximity (PRX) voltage terminal;
a bi-directional inverter connected to the RESS, the L1 voltage terminal, and the L2/N voltage terminal, the bi-directional inverter being configured to convert a direct current (DC) voltage from the RESS to an AC voltage and vice versa;
a measurement circuit connected to the G voltage terminal, the CP voltage terminal, and the PRX voltage terminal, and configured to measure a CP voltage and a PRX voltage; and
a controller in communication with the measurement circuit, wherein the controller is configured to execute instructions that cause a processor of the controller, while the AC charging inlet is electrically connected to an AC electrical device via a vehicle-to-live (V2L) load connection box and a V2L cord set forming a V2L connection, or via a jump-charge cord set and an electric vehicle service equipment (EVSE) charging cord set forming a jump-charge connection, to:
detect the CP voltage and the PRX voltage via the measurement circuit;
when the CP voltage is zero volts, evaluate whether entry conditions are satisfied, the entry conditions being indicative of a desire of a user of the host system to offload power from the battery cells of the RESS to the AC electrical device;
in response to the entry conditions, receive a modulated proximity voltage or a modulated control pilot voltage as a modulated voltage signal;
compare the modulated voltage signal to an expected voltage indicative of an identity of the AC electrical device; and
control offloading of power from the RESS to the AC electrical device when the modulated voltage signal matches the expected voltage.

12. The host system of claim 11, wherein the electrical load includes an alternating current (AC) accessory load connected to the portable charging cord set via the V2L load box, or an external RESS connected to the portable charging cord set via the EVSE charge coupler, and wherein the expected voltage includes a first expected voltage indicative of the AC accessory load and a second expected voltage indicative of the external RESS, wherein the controller is further configured to automatically distinguish between the AC accessory load and the external RESS when the modulated voltage signal matches the first expected voltage or the second expected voltage, respectively.

13. The host system of claim 12, wherein the AC electrical device is a 120V AC discharging accessory.

14. The host system of claim 12, wherein the AC electrical device is a 240V AC discharging accessory.

15. The host system of claim 11, wherein execution of the instructions causes the controller to:
determine a current state of charge (SOC) of the RESS; and
automatically discontinue offloading the power from the RESS to the AC electrical device when the current SOC drops below a calibrated SOC threshold.

16. The host system of claim 15, wherein execution of the instructions causes the controller to:
determine a distance from the host system to a nearest charging station or a next destination via the controller; and
automatically adjust the calibrated SOC threshold based on the distance and the current SOC.

17. The host system of claim 16, wherein the host system is a host vehicle, the RES S is a propulsion battery pack configured to energize propulsion functions of the host vehicle, and the set of entry conditions includes an enabling signal from a mobile device of a user of the host vehicle or a center stack of the host vehicle.

18. The host system of claim 11, wherein execution of the instructions causes the controller to measure the proximity voltage while a user of the host system toggles a switch of the V2L cord set or the jump-charge cord set.

19. The host system of claim 11, including the V2L cord set, wherein the N voltage line and the G voltage line are tied together within the V2L cord set via a shunting device.

20. The host system of claim 19, wherein the V2L cord set includes a circuit configured to control a modulation frequency of the control pilot voltage to thereby generate the modulated voltage signal.

* * * * *